United States Patent
Kuitunen et al.

(10) Patent No.: US 12,102,945 B2
(45) Date of Patent: Oct. 1, 2024

(54) APPARATUS AND METHOD FOR HEAT TREATING A FEEDSTOCK COMPRISING A LIPID MATERIAL

(71) Applicant: Neste Oyj, Espoo (FI)

(72) Inventors: Susanna Kuitunen, Espoo (FI); Jarmo Halttunen, Espoo (FI); Petri Lindqvist, Espoo (FI); Sami Toppinen, Espoo (FI)

(73) Assignee: NESTE OYJ, Espoo (FI)

( * ) Notice: Subject to any disclaimer, the term of this patent is extended or adjusted under 35 U.S.C. 154(b) by 497 days.

(21) Appl. No.: 17/417,253

(22) PCT Filed: Dec. 17, 2019

(86) PCT No.: PCT/EP2019/085641
§ 371 (c)(1),
(2) Date: Jun. 22, 2021

(87) PCT Pub. No.: WO2020/136043
PCT Pub. Date: Jul. 2, 2020

(65) Prior Publication Data
US 2022/0072446 A1   Mar. 10, 2022

(30) Foreign Application Priority Data
Dec. 28, 2018 (FI) .................................. 20186139

(51) Int. Cl.
*B01D 3/32* (2006.01)
*B01D 3/00* (2006.01)
(Continued)

(52) U.S. Cl.
CPC ............. *B01D 3/324* (2013.01); *B01D 3/009* (2013.01); *B01D 3/141* (2013.01); *B01D 3/24* (2013.01); *C11B 3/16* (2013.01)

(58) Field of Classification Search
CPC ........ B01D 3/324; B01D 3/009; B01D 3/141; B01D 3/24; B01D 3/32; B01D 11/00;
(Continued)

(56) References Cited

U.S. PATENT DOCUMENTS 732,548 A * 6/1903 Guillaume ............. B01D 3/008
261/110
1,074,913 A * 10/1913 Walter .................... B01D 3/008
261/112.1
(Continued)

FOREIGN PATENT DOCUMENTS

CN         1258224 A      6/2000
CN       101780344 A      7/2010
(Continued)

OTHER PUBLICATIONS

Notification of the First Office Action issued on Jul. 4, 2022, by the Chinese Patent Office in corresponding Chinese Patent Application No. 201980083883.8, and an English Translation of the Office Action. (13 pages).
(Continued)

*Primary Examiner* — Stephen Hobson
(74) *Attorney, Agent, or Firm* — Buchanan Ingersoll & Rooney PC

(57) ABSTRACT

Present disclosure relates to a novel process for purification of lipid material for further use as such as, for example, a source of fuel of chemicals.

17 Claims, 6 Drawing Sheets

(51) Int. Cl.
   *B01D 3/14*   (2006.01)
   *B01D 3/24*   (2006.01)
   *C11B 3/16*   (2006.01)

(58) Field of Classification Search
   CPC ...... C11B 3/16; B01J 8/00; B01J 19/00; B01J 8/008; B01J 19/006; C11C 1/08
   See application file for complete search history.

(56) References Cited

U.S. PATENT DOCUMENTS

| | | | | |
|---|---|---|---|---|
| 1,502,573 | A * | 7/1924 | Kuhn | F28F 25/06 261/DIG. 11 |
| 2,428,922 | A * | 10/1947 | Shoresman | B01J 8/0492 261/95 |
| 2,582,523 | A * | 1/1952 | Beglinger | B01D 3/42 137/262 |
| RE23,677 | E | 6/1953 | Bartleson | |
| 2,795,536 | A * | 6/1957 | Pryor | B01D 3/20 202/153 |
| 3,410,759 | A * | 11/1968 | Fontenot | C07C 2/62 585/723 |
| 3,685,971 | A * | 8/1972 | Carson | C10G 49/002 422/220 |
| 3,713,991 | A * | 1/1973 | Thomas | B01D 5/00 203/99 |
| 3,766,021 | A * | 10/1973 | Randall | B01D 3/322 585/727 |
| 3,780,076 | A * | 12/1973 | Papahronis et al. | C11B 3/001 554/205 |
| 3,871,969 | A * | 3/1975 | Chapman | C01B 7/195 203/88 |
| 4,816,191 | A * | 3/1989 | Berven | B01D 53/18 261/97 |
| 5,906,773 | A * | 5/1999 | Hausch | B01D 53/185 261/97 |
| 6,123,323 | A * | 9/2000 | Yoneda | B01D 53/18 422/220 |
| 6,172,247 | B1 | 1/2001 | Copeland et al. | |
| 6,172,248 | B1 * | 1/2001 | Copeland | C07F 9/103 554/204 |
| 6,293,526 | B1 * | 9/2001 | Fischer | B01D 3/008 261/97 |
| 7,481,871 | B2 * | 1/2009 | Frye | B01D 3/4294 96/197 |
| 8,133,519 | B2 * | 3/2012 | Kellens | C11B 7/0075 99/495 |
| 8,882,861 | B2 | 11/2014 | Cranford et al. | |
| 8,951,592 | B2 * | 2/2015 | Schols | B01D 1/28 426/601 |
| 9,522,965 | B2 | 12/2016 | Chen et al. | |
| 9,844,738 | B1 * | 12/2017 | Lee | B01F 23/235 |
| 10,744,422 | B2 * | 8/2020 | Sato | B01D 3/14 |
| 2002/0158350 | A1 * | 10/2002 | Ender | B01D 3/008 261/97 |
| 2002/0174900 | A1 * | 11/2002 | Fehr | B01D 1/00 137/521 |
| 2006/0197239 | A1 * | 9/2006 | Kister | B01D 3/008 261/97 |
| 2008/0271983 | A1 * | 11/2008 | Alzner | B01D 3/20 202/158 |
| 2009/0266743 | A1 | 10/2009 | Yao et al. | |
| 2011/0259728 | A1 * | 10/2011 | Tamminen | B01D 45/08 202/158 |
| 2012/0160453 | A1 * | 6/2012 | Alzner | B01D 53/18 165/104.13 |
| 2013/0204066 | A1 * | 8/2013 | Chretien | B01D 53/185 585/860 |
| 2013/0277869 | A1 * | 10/2013 | Haroun | B01F 23/2321 261/114.5 |
| 2013/0287925 | A1 * | 10/2013 | Schols | B01D 3/38 426/601 |
| 2014/0148609 | A1 | 5/2014 | Roussis et al. | |
| 2014/0232023 | A1 * | 8/2014 | Kister | B01D 3/4294 202/262 |
| 2015/0353864 | A1 * | 12/2015 | Vermeiren | C10G 3/45 554/162 |
| 2016/0151722 | A1 * | 6/2016 | Wehrli | B01F 23/2321 261/114.5 |
| 2016/0175733 | A1 * | 6/2016 | Haroun | B01F 23/214 261/113 |
| 2016/0220949 | A1 * | 8/2016 | Tripodi | B01D 3/30 |
| 2016/0332090 | A1 * | 11/2016 | Johannesen | B01D 3/32 |
| 2016/0339355 | A1 * | 11/2016 | Alzner | C10K 1/18 |
| 2017/0014730 | A1 * | 1/2017 | Hammon | C07C 51/44 |
| 2017/0182440 | A1 * | 6/2017 | Moll | B01D 45/08 |
| 2017/0348609 | A1 * | 12/2017 | Shields | B01D 3/324 |
| 2017/0361242 | A1 * | 12/2017 | Lee | B01F 23/214 |
| 2021/0292657 | A1 | 9/2021 | Toukoniitty et al. | |
| 2022/0073840 | A1 * | 3/2022 | Lindqvist | C11B 3/04 |

FOREIGN PATENT DOCUMENTS

| | | |
|---|---|---|
| CN | 102492546 A | 6/2012 |
| CN | 202289553 U | 7/2012 |
| CN | 102965182 A | 3/2013 |
| CN | 103409232 A | 11/2013 |
| EP | 0574272 A2 | 12/1993 |
| EP | 3260180 A1 | 12/2017 |
| FI | 20135638 A | 12/2014 |
| FI | 20185650 A1 | 1/2020 |
| GB | 1510056 A | 5/1978 |
| GB | 2412664 A | 10/2005 |
| GB | 2481698 A | 1/2012 |
| WO | 2006097302 A1 | 9/2006 |
| WO | 2011041076 A1 | 4/2011 |
| WO | 2013006578 A1 | 1/2013 |
| WO | 2013063085 A1 | 5/2013 |
| WO | 2014111598 A2 | 7/2014 |
| WO | 2014111598 A3 | 10/2014 |
| WO | 2018024728 A1 | 2/2018 |
| WO | 2018060302 A1 | 4/2018 |
| WO | 2018060324 A1 | 4/2018 |
| WO | 2020016400 A1 | 1/2020 |

OTHER PUBLICATIONS

Database WPI, 2017 Clarivate Analytics, Week 201363, AN 2013-J72693, XP002797057, Thomson Scientific, London, GB. (2 pages).
International Preliminary Report on Patentability (PCT/IPEA/409) issued in corresponding International Patent Application No. PCT/EP2019/085398 dated Mar. 11, 2021. (9 pages).
International Preliminary Report on Patentability (PCT/IPEA/409) issued in corresponding International Patent Application No. PCT/EP2019/085641 dated Apr. 12, 2021. (16 pages).
International Search Report (PCT/ISA/210) and Written Opinion (PCT/ISA/237) mailed on Jan. 31, 2020, by the European Patent Office as the International Searching Authority for International Application No. PCT/EP2019/085398. (11 pages).
International Search Report (PCT/ISA/210) and Written Opinion (PCT/ISA/237) mailed on Mar. 9, 2020, by the European Patent Office as the International Searching Authority for International Application No. PCT/EP2019/085641. (11 pages).
First Office Action issued on Dec. 29, 2023, by the Chinese Patent Office in corresponding Chinese Patent Application No. 201980083489.4, and an English Translation of the Office Action. (14 pages).
Office Action issued on Dec. 7, 2023, by the Brazilian Patent Office in corresponding Brazilian Patent Application No. BR112021011202-2. (4 pages).
Office Action issued on Dec. 9, 2022, by the Indian Patent Office in corresponding Indian Patent Application No. 202117026604. (5 pages).
Office Action issued on Feb. 28, 2024, in U.S. Appl. No. 17/417,307. (38 pages).

(56) References Cited

OTHER PUBLICATIONS

Office Action issued on Mar. 13, 2024, by the Canadian Patent Office in corresponding Canadian Patent Application No. 3,122,641. (5 pages).

* cited by examiner

APPARATUS AND METHOD FOR HEAT TREATING A FEEDSTOCK COMPRISING A LIPID MATERIAL

TECHNICAL FIELD

Present invention relates to an apparatus and its use in a method for heat treating a feedstock comprising a lipid material. The apparatus enables and permits the use of a method for purifying feedstock comprising low-quality lipidic feedstock material containing high levels of phosphorous and metals.

BACKGROUND ART

U.S. Pat. No. 3,713,991 relates to a method wherein dimethylformamide is recovered by crystallisation and distillation from a feedstock.

U.S. Pat. No. 8,133,519 relates to a method for separation and purification of edible oils and derivatives thereof by crystallisation wherein use of internal agitators is avoided.

U.S. Pat. No. 8,951,592 relates to a physical refining of triglyceride oils and fats offering an improved yield of edible oils and fats. The process involves use of edible oils that have previously been degummed such that the content of phosphorous is below 10 ppm.

U.S. Pat. No. 9,051,533 relates to a continuous process for dry fractioning of edible oils and fats wherein the process uses one or more crystallisers.

WO 2006/097302 relates to a method for manufacturing of packed beds columns with the aim of reducing flow resistance.

The above mentioned background art aims at purifying various starting materials. However, present invention enables a more efficient and improved method in comparison to prior art in that low quality feedstock may be used. Moreover, the inventors of present invention has developed a novel apparatus for efficient execution of the method as discussed herein.

SUMMARY OF THE INVENTION

Present invention provides for an apparatus for use in any oil or petroleum refining process. The process may be a pretreatment process of feedstock to be used in further downstream processes. The apparatus may be part of e.g. a distillation apparatus or distillation tower. The apparatus according to the invention enables the use of an efficient method of purification of low quality feedstock such as e.g. a lipid material which may be e.g. low quality fats and oils of various origin or any mixtures thereof.

It is an object of certain aspects of the present invention enable a method for treating or pretreating a lipid material comprising phosphorous and/or metal compounds, the method comprising
  providing the lipid material,
  preheating the lipid material, to obtain a preheated lipid material,
  heat treating the preheated lipid material in a heat treatment step, to obtain a heat treated lipid material,
  optionally post treating the heat treated lipid material in a post treatment step.

In one embodiment, the preheating step b) is conducted at a temperature of about 90° C. to about 160° C.

In a preferred embodiment the heat treating step c) is conducted at a temperature of about 220° C. to about 300° C., preferably about 220° C. to about 280° C., more preferably about 260° C. to about 280° C.

In another preferred embodiment the heat treating step c) is conducted at a pressure of about 0 bar(g) to about 20 bar(g), preferably about 1 bar(g) to about 10 bar(g), more preferably about 1 bar(g) to about 3 bar(g).

In a further embodiment the heat treating step c) is conducted during a time of about 5 to about 300 minutes, preferably about 10 to about 180 minutes, more preferably about 15 to about 90 minutes, even more preferably about 30 to about 60 minutes.

In one embodiment the moisture content of the lipid material during the heat treatment is about 200 to about 2500 mg/kg, preferably about 200 to about 1500 mg/kg, more preferably about 200 mg/kg to about 1000 mg/kg.

In a further embodiment of the present invention, the lipid material is renewable lipid material.

In a preferred embodiment, the lipid material is a plant based, microbial based or animal based lipid material, or any combination thereof.

In one embodiment of the present invention, the preheating step b) further comprises an air removal step.

Preferably, the phosphorous compounds are phospholipids selected from a group comprising phosphatidyl ethanolamines, phosphatidyl cholines, phosphatidyl inositols and phosphatidic acids.

In one embodiment, the post treating step d) comprises addition of moisture to the lipid material.

In a further embodiment, the heat treating step c) takes place in at least one reactor.

In a preferred embodiment, the at least one reactor is selected from tube reactor and/or stirred tank reactor.

In one embodiment of the present invention, part of the lipid material that has been subject to the heat treating step c) is withdrawn, heated to a temperature of about 300° C. to about 350° C. and reintroduced into step c) where the lipid material is being subject to the heat treating step c).

In another embodiment, the post treating step d) comprises cooling, settling, filtration, centrifugation and/or bleaching.

In a preferred embodiment, the post treating step d) is bleaching.

In a further embodiment, the lipid material provided in step a) comprises about 30 to about 2000 mg/kg phosphorous, preferably about 30 to about 1000 mg/kg phosphorous, more preferably about 50 mg/kg to about 600 mg/kg phosphorous.

In one embodiment, the method further comprises hydrotreatment of the lipid material in the presence of a hydrotreatment catalyst in order to obtain a hydrotreated lipid material.

In a preferred embodiment, the hydrotreatment may be selected from hydrodeoxygenation (HDO), hydrodesulfurisation (HDS), hydrodemetallization (HDM), hydrodenitrification (HDN) and/or hydrodearomatisation (HDA).

In one embodiment of the present invention, the method further comprises a second heat treatment after the heat treating step c).

A further object of the present invention is to provide a method for producing hydrocarbons, comprising
  x) reducing the amount of phosphorous and/or metal compounds in a lipid material, using a method as specified above, and
  y) subjecting the lipid material from step x) to an oil refinery conversion process.

In one embodiment, the oil refinery conversion process comprises altering the molecular weight of the lipid material, removal of heteroatoms from the lipid material, altering the degree of saturation of the lipid material, rearranging the molecular structure of the lipid material, or any combination thereof, to obtain at least one hydrocarbon.

In a further embodiment, step y) comprises hydrocracking.

In another embodiment, step y) comprises steam cracking.

According to a further embodiment, step y) comprises isomerization.

In one embodiment, step y) comprises thermal catalytic cracking.

In another embodiment, step y) comprises fluid catalytic cracking.

The above referenced method is further described in detail in FI 20186137, and incorporated herein by reference in its entirety.

Feedstock

In present invention the term "lipid material" or fat(s) or feedstock (used herein and throughout the description interchangeably) should be understood as meaning any feed stock comprising any lipid material, such as e.g. animal based oils or fats, such as e.g. fish based oils or fats, suet, tallow, blubber, recycled alimentary fats etc. It is to be understood that the term may comprise a mixture of any of the above mentioned examples. However, in other embodiments the term "feedstock" may comprise any type of lipid or fat. For example, the term may comprise a lipid material/oil of plant, microbial and/or animal origin. Non-limiting examples are one or more of tall oil or the residual bottom fraction from tall oil distillation processes, vegetable or plant based oil or fat such as e.g. sludge palm oil or used cooking oil, microbial or algae oils, free fatty acids, or any lipids containing phosphorous and/or metals, oils originating from yeast or mould products, oils originating from biomass, rapeseed oil, canola oil, colza oil, sunflower oil, soybean oil, hemp oil, olive oil, linseed oil, cottonseed oil, mustard oil, palm oil, arachis oil, castor oil, coconut oil, starting materials produced by genetic engineering, and biological starting materials produced by microbes such as algae and bacteria or any mixtures of said lipid materials.

The impurities present in the feedstock may be of various character or origin. Such impurities may be various metal impurities and/or impurities of phosphorous origin such as e.g. various phosphorous containing compounds that may be either organic or inorganic or a mixture thereof. The invention thus provides a very efficient method for purifying low quality feedstock that would otherwise be unsuitable for further use or regarded as uneconomical for further use after any purification owing to high contents of i.a. metal impurities and/or phosphorous impurities as mentioned herein.

Specifically, the impurities are such that they may be harmful in processes commonly used in any refining industry. For example, such impurities may poison or deactivate catalysts used in any further processing of the lipid material following the process of present invention. The impurities may be of metallic or polymeric origin such as elementary metals or for example phosphorous compounds. A further problem that may arise from using low quality feedstock is that during a purification process impurities may clog filters or form deposits in piping or other parts of machinery such as e.g. mixing paddles, heating elements etc., which would hamper the process or render the machinery used in any such process useless. Thus, present invention overcomes the difficulties commonly seen when using low quality feedstock which usually entails a diminished capacity of the purification process and/or resulting in a purified feedstock which does not fulfil industry standard/requirements for further use as described herein.

Consequently, the invention also relates to use of a purified feedstock obtainable by the method according to present invention, as a source of fuel, bulk chemicals such as e.g. polymers, solvents, lubricants, or specialty chemicals such as e.g. cosmetics, pharmaceuticals etc.

Thus, the method according to the invention provides for a pretreated or purified feedstock that fulfils the requirements for bulk chemicals or specialty chemicals such that the necessary purity requirements for such chemicals are met.

In one aspect, present invention thus solves the problem encountered when using low quality feedstock for further use such as e.g. as fuel. Such fuel may be e.g. diesel or jet fuel. In another aspect, the invention enables use of treated low quality feeds for any suitable use, such as for further use as chemicals or as starting material for preparation of any suitable chemicals.

Specifically, the invention results in at least one or more of the following effects;

1) Removal or reduction of build-up of sediments or crystalline material or coking with respect to any parts or the apparatus and its internal structure.
2) Minimising operational costs.
3) Removal or reduction of any residues in the feedstock, thereby preventing catalyst deactivation and/or plugging.
4) Partially or complete removal of any volatile components present in the feedstock, such as e.g. solvents, short chain acids such as .e.g organic or inorganic acids, odour components thereby minimising emissions to the atmosphere or pollution of waste water.
5) Enabling use of low quality feedstock generally considered unsuitable for further use or uneconomical for further purification.

Thus, by the use of the apparatus described herein, a method allowing for a large scale process of feedstock offering a robust and cost effective method is provided and herein several technical problems usually encountered in similar processes are overcome.

Present invention relates to an apparatus which may comprise a body of any suitable material such as e.g. steel.

Specifically, the invention solves the problem of large scale production of e.g. diesel or jet fuel from low quality feedstock. The apparatus according to the invention which may be regarded as a heat treatment reactor equipment is used for preparation of fuels from e.g. animal fat by heat treatment. The apparatus according to the invention provides for sufficient retention time for reactions to proceed. Moreover, there is possibility to settle solid particles in the feedstock or in any intermediate process. Settling could decrease the fouling of the heat exchanger in the circulation flow and consequently decrease maintenance costs.

The body may comprise at least one inlet and at least one outlet.

The apparatus may further comprise at least one of the following elements:
i) one or more mixing sectors,
ii) one or more liquid distribution sector,
iii) one or more liquid retention sector.

Mixing Sector

The one or more mixing sectors consist of elements which provides or enables mixing of the involved components and/or gas-liquid contact between some or all components involved in the process. In one aspect the mixing elements may be e.g. shower deck plates or trays. This section may be suitable placed in the top part of the apparatus as a whole. During the process, fat flows downwards creating a curtain and water vapour going upwards goes through the curtain. At the top, the fresh feed flow in to the apparatus and circulation flow, from already processed material in the apparatus, are mixed. On the elements or shower deck plates as mentioned above these two flows are mixed. Additionally, water, from vapour phase is dissolved wholly or partially in the fat used as the feedstock (raw material). Without being bound to any hypothesis, it is believed that the heat treatment reactions, taking place in the liquid phase, require some water.

The mixing sector is in fluid connection with the liquid distribution sector and the liquid retention sector.

The mixing sector may have any suitable dimensions. However, the apparatus is aimed for industrial plant production and consequently should be suitable for large scale. The mixing sector may be cylindrical in shape and comprising an upper part which comprises one or more inlets. Suitable these inlets are the feed inlet and the re-circulation inlet.

The Liquid Distribution Sector

In this sector the liquid is evenly distributed to the subsector 1 (in retention sector C, FIG. 1) using liquid distributor ensuring equal reaction time for the whole fat flow. Thus, this sector is suitably placed between and in liquid connection with the mixing sector and the liquid retention sector. This sector is constructed in such manner that vapour does not accumulate below it. This section may contain one or more elements, which may be called liquid distribution elements, which may be plates, decks weirs etc, to aid the process. In one specific embodiment the section comprises two plates. One plate or tray is positioned at the lower part of the sector and placed in a horizontal position. The second plate or tray may be horizontal or slightly tilted. This second upper plate provides for the prevention of siphoning effect together with the middle tilted tray described immediately below. In a further aspect, the section may comprise a further tilted plate or tray in between the lower and upper plates or trays. This plate or tray is tilted (in relation to the horizontal plane) to an angle of about 5° to about 20° preferably to an angle of about 5 to about 15°, or about 5°, such as e.g. about 10°, such as e.g. about 15°, such as e.g. about 20°. The angle is chosen in such way there is not too much or too low amount of liquid on the tray in order to e.g. reduce or eliminate mechanical stress on the tray and also ensure effective mixing contact between all components in the feed to be processed. The upper plate or tray may also be parallel with the tilted middle tray or plate and may thus have an incline identical to the middle titled tray. This also includes even distribution of the components in this part of the apparatus. A further aspect is to keep sufficient flowrate on the tray to thereby e.g. prevent fouling.

Liquid Retention Sector

This sector is for providing sufficient time for the desired heat treatment reactions. This sector is suitably placed in the bottom of the apparatus and thus in fluid connection with the liquid distribution sector. This sector may further be divided into one or more subsections or chambers that may be in fluid connection with one another. There may be e.g. 1 or more subsections, such as e.g. 2 or more subsections, such as e.g. 3 or more subsections, such as e.g. 4 or more subsections, such as e.g. 5 or more subsections, such as e.g. 6 or more subsections, such as e.g. 7 or more subsections, such as e.g. 8 or more subsections etc. In one aspect, the liquid retention sector may comprise three subsectors (1-3). The subsectors may be chambers or may e.g. be pipes etc.

The liquid from sector B enters subsector 1. In subsector 1, water vapour is sparged from the bottom to provide mixing and moisture control. After flowing through subsector 1, part of the liquid flows to the product outlet and leaves the reactor. Rest of the liquid flows through subsectors 2 and 3 providing further retention time for the reactions. Additionally, there is possibility that the biggest and heaviest solid particles could settle in subsector 2. This is thought to prevent fouling of the heat exchanger equipment used for heating the circulation flow. Additional feature of sector C are vertical pipes, with valves, connecting subsectors 2 and 3, at different levels. The purpose of these pipes is to control the retention time in the reactor. When valve is opened on any of the levels, the liquid level settles on the pipe level. The pipes are dimensioned in such way that the liquid level is the same in subsectors 2 and 3.

Consequently, the liquid retention sector has at least one outlet and preferably two or more outlets. In one aspect, one outlet is for collecting the pretreated product of the process. The second outlet will recirculate a substandard material back into the process and consequently will be fed back to Sector A and the liquid distribution sector.

The apparatus enables to use of methods wherein a feedstock is pretreated such that some or all impurities, such as e.g. metals and phosphorous compounds are converted into in such form that they are more easily removed in the following processes such as e.g. a bleaching process.

Fresh feed is suitable provided and led to the top of the liquid distribution sector. This may thus be combined with recirculated material from the liquid retention sector.

DETAILED DESCRIPTION

Figure 1:
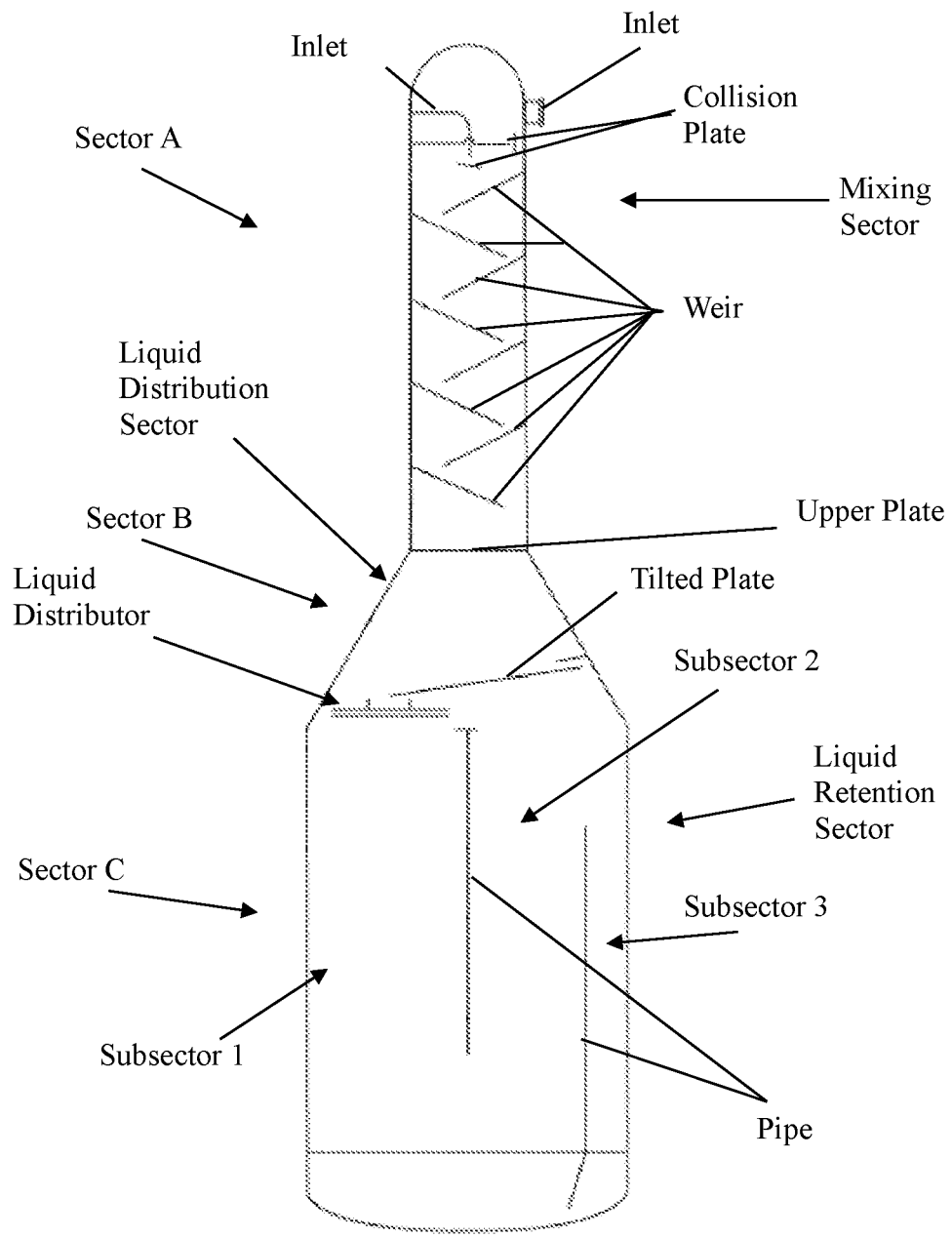
FIG. 1 illustrates a schematic layout of the apparatus according to the invention

Present invention relates to an apparatus that may be suitably employed in any oil or petroleum refining process or purification process.

The apparatus according to the invention may be part of a larger apparatus or a plant system, such as e.g. a distillation unit or distillation tower.

Specifically, the apparatus of present invention comprises a body of essentially any suitable shape such as e.g. essentially spherical or essentially cylindrical. The body may also be a combination of suitable geometrical shapes or volumes, such as e.g. a combination of essentially cylindrical shapes or volumes and/or essentially spherical shapes or volumes and/or partially conical shapes or volumes and/or partially ellipsoidal shapes or volumes. It is also to be understood that the body may have a cylindrical surface, wherein the base of the cylinder may be circular or elliptical. The cylinder may be right or oblique. In one aspect the body of the apparatus comprises a right cylinder form and the base is essentially circular.

In another aspect of the invention, the body of the apparatus is a combination of a partially conical shape or volume in combination with a circular cylindrical shape or volume and in combination with a partially ellipsoidal shape or volume.

In addition to having at least one inlet and at least one outlet, the body of the apparatus according to the invention may have a third outlet such that heat conveyed by steam or liquid from the apparatus may be circulated back to any part of the unit (i.e. heat circulation outlet). One example may be that the steam and/or fluid from the body of the apparatus is conveyed from the heat circulation outlet and led back to another part of the unit wherein the apparatus body is one part of the entire unit. Circulating heat may thus be back to a distillation or fractioning unit to which the apparatus body is connected.

In one aspect, the apparatus may have one inlet for provision of fresh feed and another inlet for any recirculated material which has been partially or wholly processed. These to inlets are suitable in fluid connection with Sector A (Mixing Sector).

The body of the apparatus may be made of any suitable material able to withstand elevated temperatures and/or corrosive substances and/or solvents without losing its integrity. Non-limiting examples may be e.g. any material able to withstand temperatures in the range of about e.g. 0° C. to about 500° C., and/or corrosive materials such as e.g. acids or bases of any kind, and/or organic and inorganic solvents or any kind. Such material may be e.g. steel and in particular stainless steel. The body of the apparatus may also comprise an inside lining which is being able to withstand elevated temperatures and/or corrosive substances and/or solvents without losing its integrity as mentioned above.

The body of the apparatus is essentially a closed body or volume which comprises at least one inlet and at least one outlet. In one aspect, the inlet and/or outlet may be part of a larger unit, such as e.g. distillation tower. In one aspect, at least one inlet is in connection with a further unit, such as e.g. a distillation tower and/or fractioning unit.

In one aspect, the body of the apparatus has a top part which may be a conical part or may be a semi-spherical in shape which is in connection with e.g. a distillation or fractioning unit, which may be seen as the inlet of the body of the apparatus. In a further aspect, the body of the apparatus has a bottom part which may be of a partially spherical or ellipsoidal volume or shape, wherein said bottom part has at least one outlet such as e.g. at least two outlets for collection of purified or refined material or processed material.

The body of the apparatus comprises further plates or weir elements. In one aspect, the invention relates to a body comprising at least four internal parts. The internal parts may be plates or weirs.

It is to be noted that the terminology "plates", "trays", "weirs" etc. are used interchangeably throughout the description. These terms may fall under the general term "elements".

In one aspect, the apparatus according to the invention is illustrated by, but not limited to, FIG. 1.

Mixing Sector

The one or more mixing sectors consist of mixing elements which provides for or enables mixing of the involved components and/or gas-liquid contact between some or all components involved in the process. In one aspect the elements may be e.g. shower deck plates or trays etc. This section may be suitable placed in the top part of the apparatus as a whole. During the process, fat flows downwards creating a curtain and water vapour going upwards goes through the curtain. At the top, the fresh feed flow in to the apparatus and circulation flow, from already processed material in the apparatus, are mixed. On the elements or shower deck plates as mentioned above these two flows are mixed. Additionally, water, from vapour phase is dissolved wholly or partially in the fat used as the feedstock (raw material). Without being bound to any hypothesis, it is believed that the heat treatment reactions, taking place in the liquid phase, require some water.

The mixing sector is in fluid connection with the liquid distribution sector and the liquid retention sector.

The mixing sector may have any suitable dimensions. However, the apparatus is aimed for industrial plant production and consequently should be suitable for large scale production. The mixing sector may be cylindrical in shape and comprising an upper part which comprises one or more inlets. Suitably, these inlets are the feed inlet and the re-circulation inlet.

Figure 4:
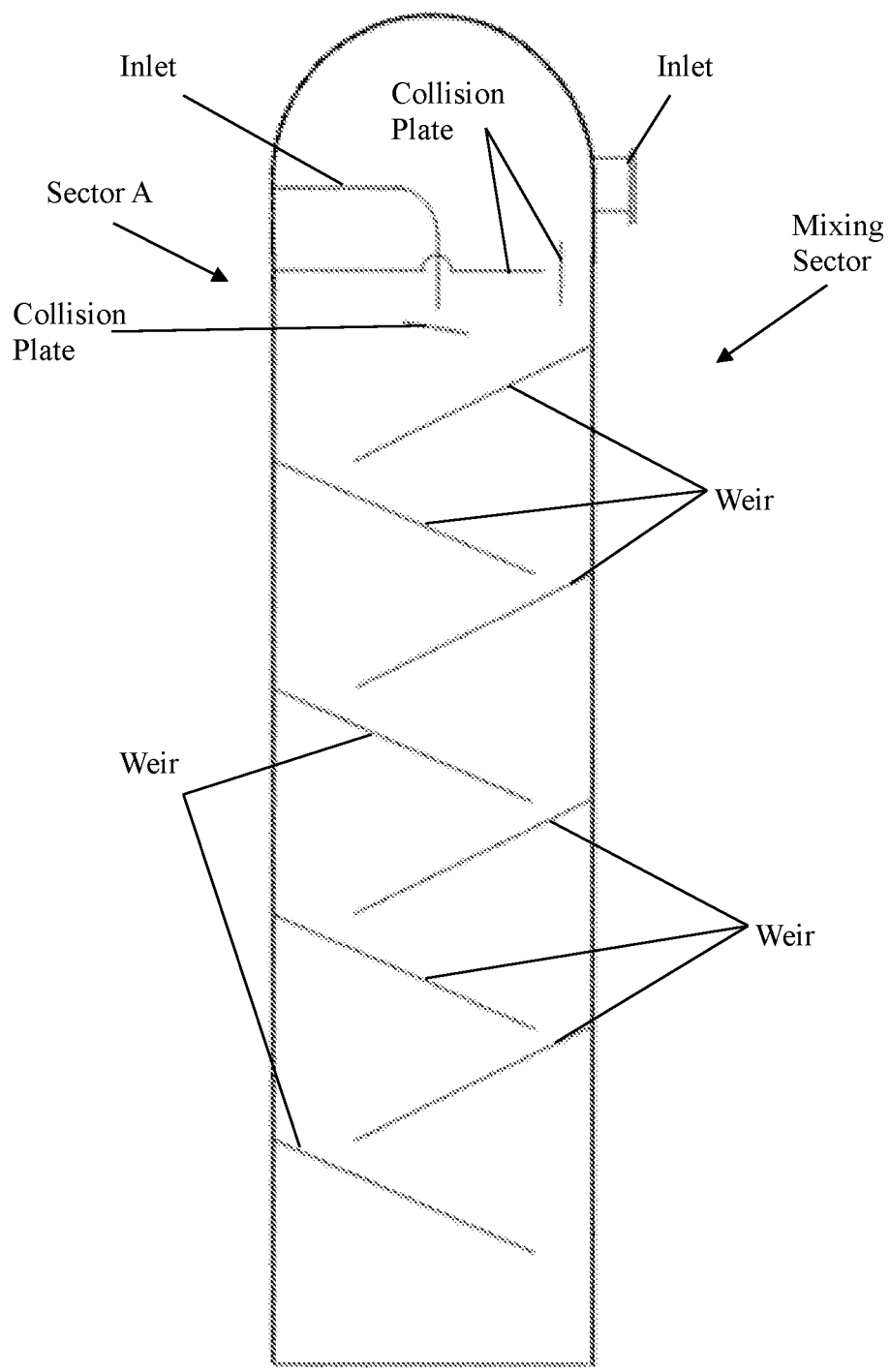
FIG. 4 illustrates the mixing sector.

In one aspect of the invention, the internal parts of the mixing sector may comprise several plates or weirs, such as e.g. at least 4 or more plates or weirs, such as e.g. at least 5 or more plates or weirs, at least 6 or more plates or weirs, at least 7 or more plates or weirs, at least 8 or more plates or weirs, at least 9 or more plates or weirs, at least 10 or more plates or weirs, at least 15 or more plates or weirs, at least 20 or more plates or weirs. These plates may be suitable tilted in any angle between 0 to 20 degrees. The plates are tilted (in relation to the horizontal plane) to an angle of about 5° to about 20° preferably to an angle of about 5 to about 15°, or about 5°, such as e.g. about 10°, such as e.g. about 15°, such as e.g. about 20°. In one aspect, the plates, elements, trays or weirs serve to create a curtain that for steam to pass through. The mixing sector is illustrated but not limited to FIG. 4, wherein shower decks or trays are illustrated as elements 1-8. Thus in one aspect, the mixing sector according to the invention may be according to FIG. 4.

Figure 2:
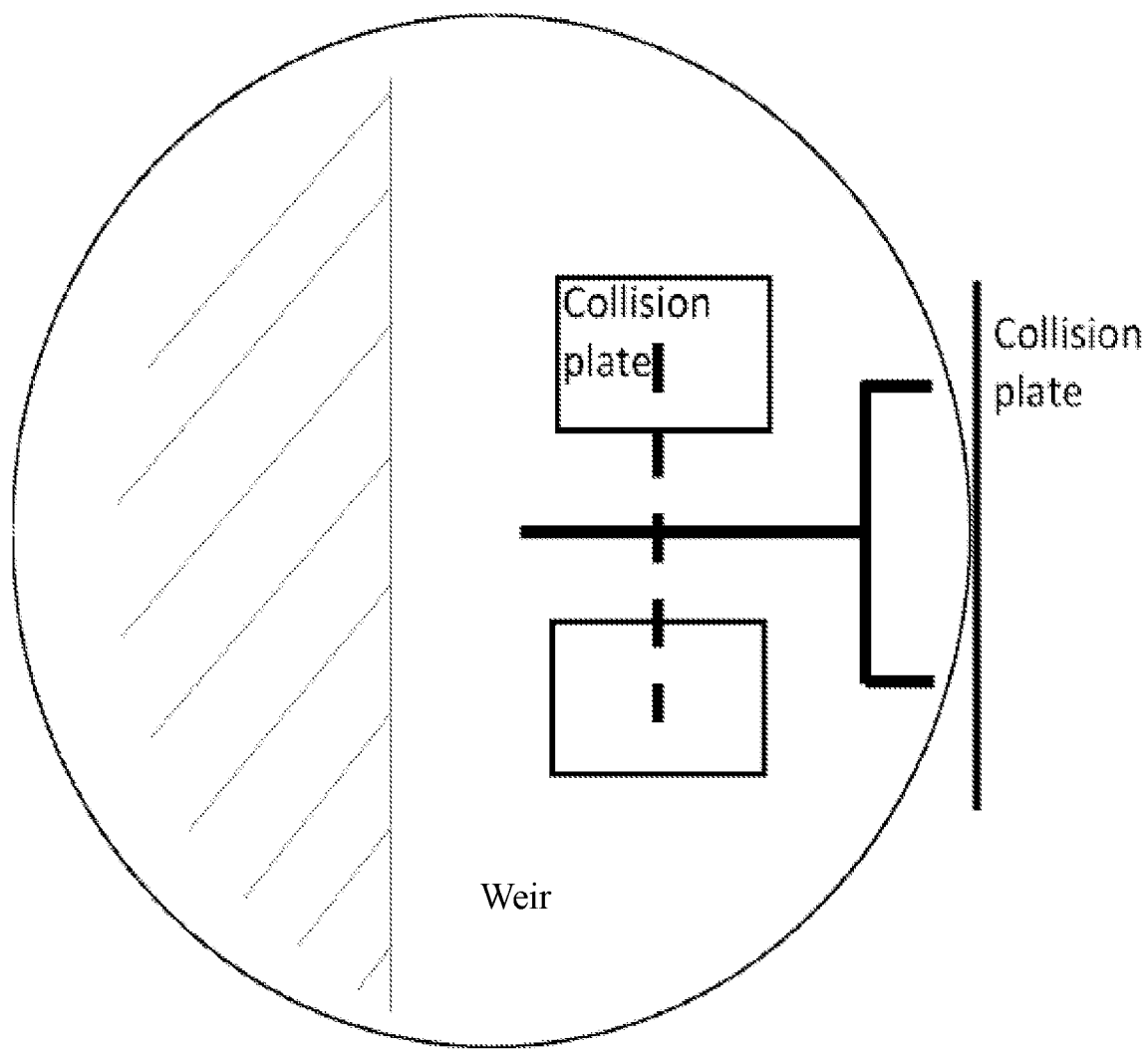
FIG. 2 illustrates the top part of the mixing sector of the apparatus according to the invention seen from the top.
Figure 3:
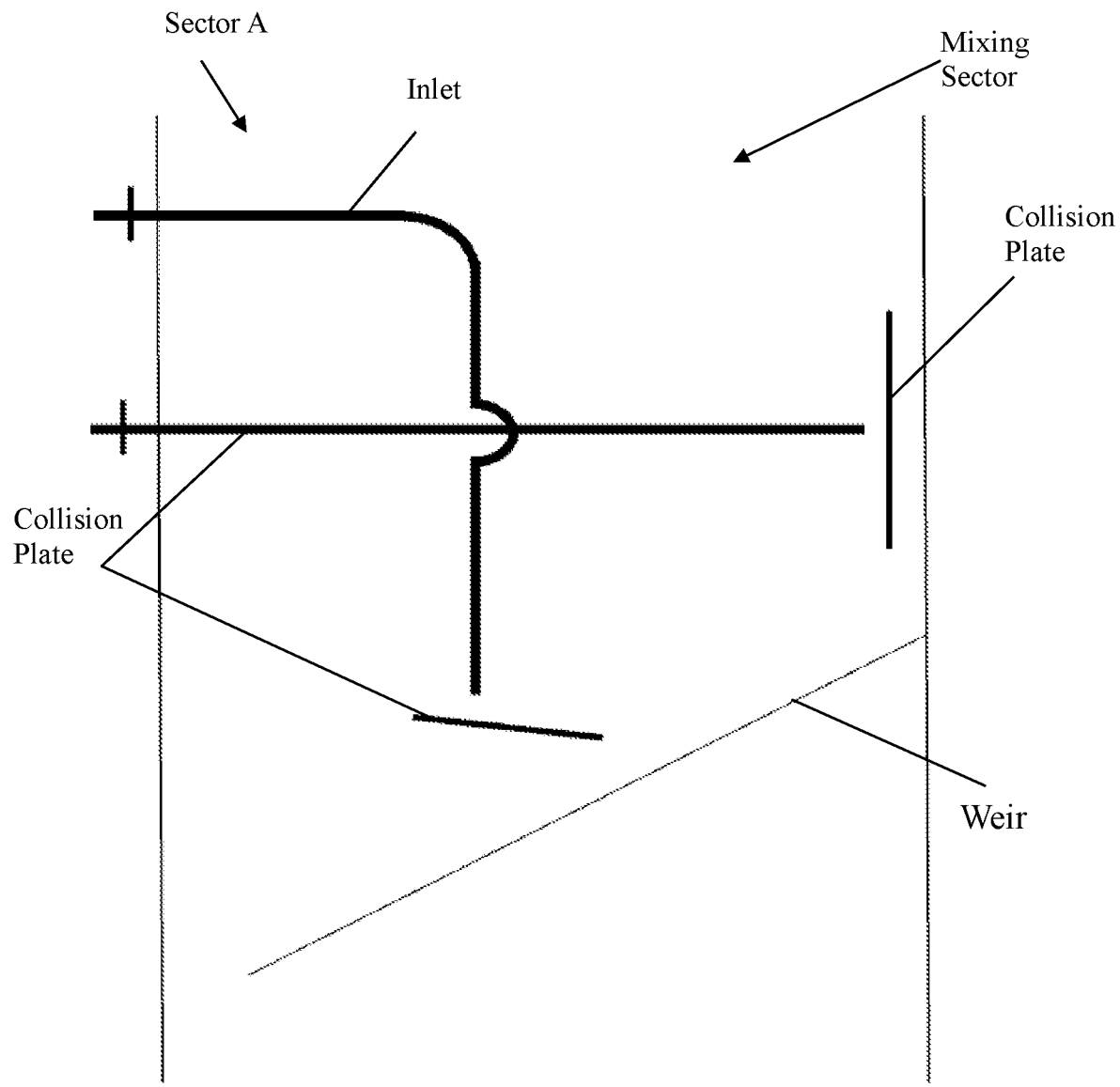
FIG. 3 illustrates the top part of the mixing sector of the apparatus according to the invention seen from the side view.

The mixing sector may also comprise a top part (illustrated in FIG. 2 (top view) and FIG. 3 (side view). The top part is for ensuring even distribution of the provided raw untreated feed stock. Thus in one non-limiting example this section provides for even distribution of the feed stock entering the apparatus and being fed to the apparatus by e.g. spraying or pumping etc. This portion is placed above all the remaining elements (such as e.g. plates, trays or weirs illustrated in FIG. 4) in this sector. This portion may comprise e.g. one or more collision plates, such as e.g. 2 or more, such as e.g. 3 or more, such as e.g. 4 or more etc. collision plates. One collision plate may be vertical, whereas the second collision plate may have a slight tilt in any angle between about 0 to about 20 degrees, such as e.g. 5-20 degrees etc. In one aspect of the invention the collision plates are illustrated as seen in FIGS. 2 and 3, but not limited thereto. Thus the illustrated features of the apparatus of FIGS. 2 and 3 are merely one non-limiting example of ensuring even distribution of the feed stock.

The Liquid Distribution Sector

Figure 5:
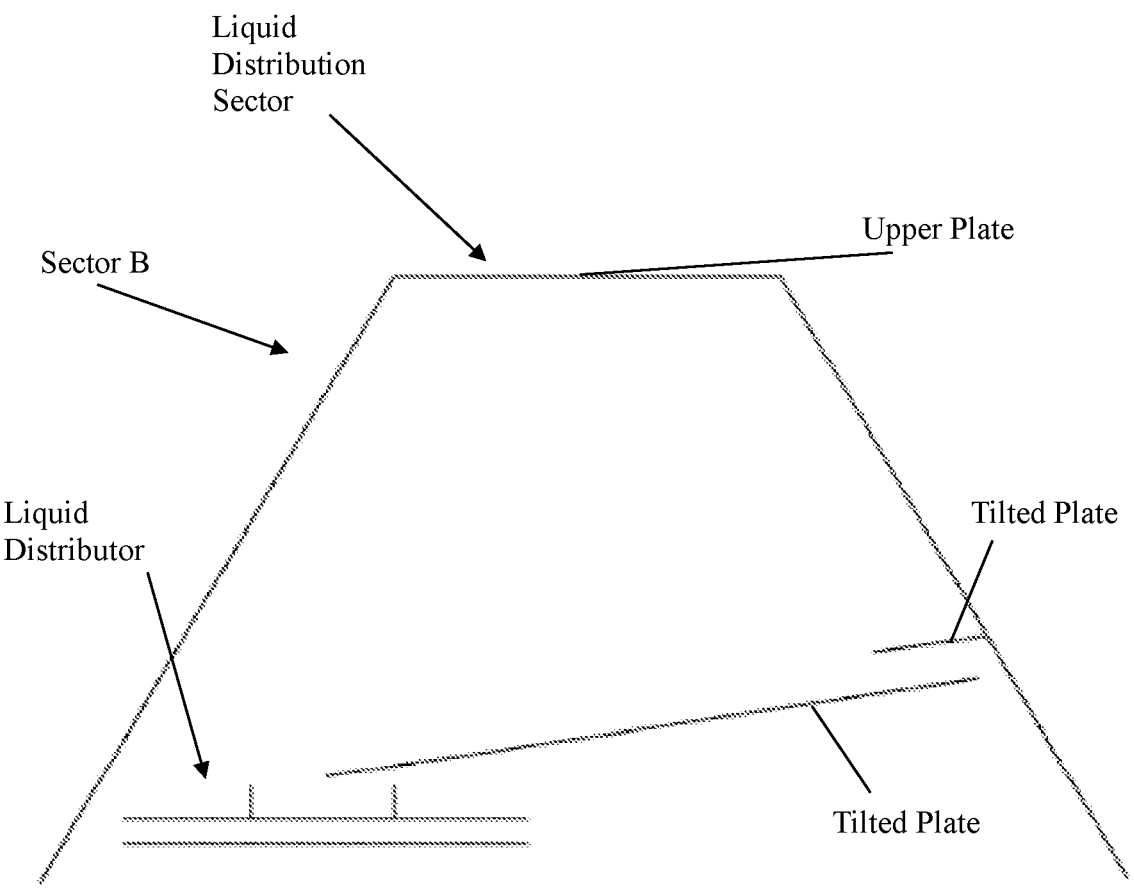
FIG. 5 illustrates the liquid distribution sector.

As mentioned herein, in this sector the liquid is evenly distributed to the subsector 1 (in retention sector C, FIG. 1) using liquid distributor ensuring equal reaction time for the whole fat flow. Thus, this sector is suitably placed between and in liquid connection with the mixing sector and the liquid retention sector. This sector is constructed in such manner and effects that vapour does not accumulate below it. This section may contain one or more plates or elements to aid the process. In one specific embodiment the section comprises two or more plates, such as e.g. 3 or more plates, 4 or more plates, 4 or more plates etc. In one aspect, this sector may be illustrated as seen in FIG. 5 but limited thereto. One element in this sector may be a liquid distributor and which is illustrated but not limited to the lower element seen in FIG. 5, and therein depicted as two horizontal lines and two shorter vertical lines. One plate or tray may be positioned above the liquid distributor. This plate is suitable horizontal. The second plate or tray may be slightly tilted. Furthermore, the second plate or tray may be placed in between the liquid distributor and the first plate or tray. In a further aspect, the section may comprise a tilted plate or tray in between the lower and upper plates or trays. This aspect is illustrated in FIG. 5, but not limited thereto. This second tray or plate is tilted (in relation to the horizontal plane) to an angle of about 5° to about 20° preferably to an angle of about 5 to about 15°, or about 5°, such as e.g. about 10°, such as e.g. about 15°, such as e.g. about 20°. The angle is chosen in such way there is not too much or too low amount of liquid on the tray in order to e.g. reduce or eliminate mechanical stress on the tray and also ensure effective mixing contact between all components in the feed to be processed. This also includes even distribution of the components in this part of the apparatus. A further aspect is to keep sufficient flowrate on the tray to thereby prevent e.g. fouling.

In one aspect, this sector of the apparatus may have any suitable shape, such as cylindrical or partly conical or any combinations thereof. In one aspect, the shape may be partly conical as illustrated but not limited to FIG. 5.

In one aspect, the liquid distributor type may be a gravity liquid distributor. Solids in feedstock need to be considered such that such distributor is chosen so as to avoid plugging. Non-limiting examples are provided by Sulzer: splash-plate distributor VEP, channel-type distributor with lateral tubes VKR. Example provided by Koch-Glitschin: Notched troug.

Liquid Retention Sector

Figure 6:
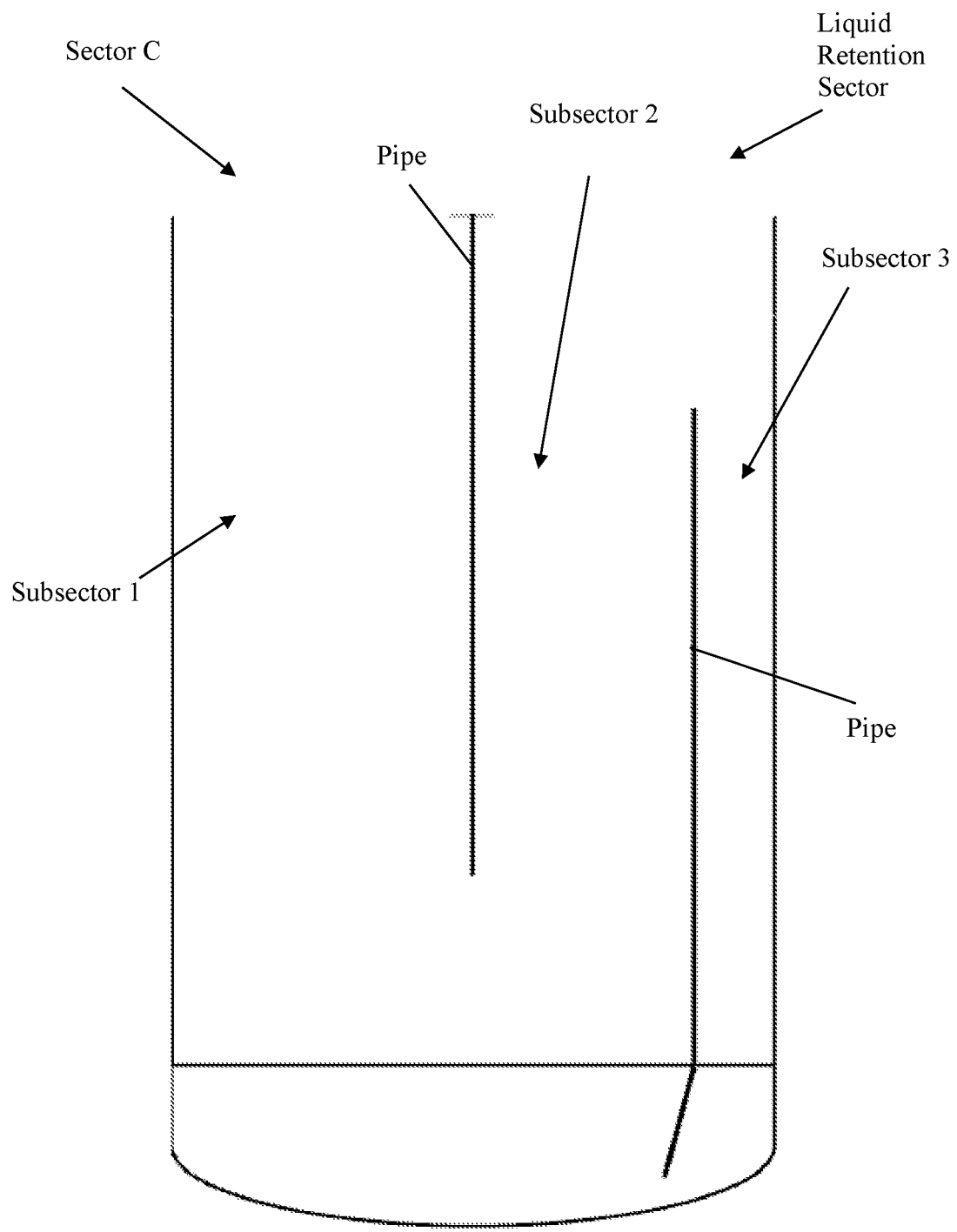
FIG. 6 illustrates the liquid retention sector with subsectors 1-3.

As mentioned herein, this sector is for providing sufficient time for the desired heat treatment reactions. This sector is suitably placed in the bottom of the apparatus and thus in fluid connection with the liquid distribution sector. This sector may further be divided into one or more subsections or chambers that may be in fluid connection with one another. There may be e.g. 1 or more subsections, such as e.g. 2 or more subsections, such as e.g. 3 or more subsections, such as e.g. 4 or more subsections, such as e.g. 5 or more subsections, such as e.g. 6 or more subsections, such as e.g. 7 or more subsections, such as e.g. 8 or more subsections, such as e.g. 10 or more subsections, such as e.g. 20 or more subsections etc. In one aspect, the liquid retention sector may comprise three subsectors (1-3). This aspect is illustrated but not limited to FIG. 6. The subsectors may be chambers or may e.g. be pipes etc or any mixtures thereof. The liquid from sector B enters subsector 1. In subsector 1, water vapour is sparged from the bottom to provide mixing and moisture control. After flowing through subsector 1, part of the liquid flows to the product outlet and leaves the reactor. Rest of the liquid flows through subsectors 2 and 3 providing further retention time for the reactions. Additionally, there is possibility that the biggest and heaviest solid particles could settle in subsector 2. This is thought to prevent fouling of the heat exchanger equipment used for heating the circulation flow.

Additional feature of sector C are vertical pipes, with valves, connecting subsectors 2 and 3, at different levels. The purpose of these pipes is to control the retention time in the reactor. When valve is opened on any of the levels, the liquid level settles on the pipe level. The pipes are dimensioned in such way that the liquid level is the same in subsectors 2 and 3.

In subsector 2, the liquid linear velocity is below 2 cm/s, which enables settling.

With respect to the liquid retention sector, and as mentioned above, this sector may comprise one or more subsector. In one aspect, at least one subsector is in fluid connection with the mixing sector. In a further aspect, only subsector 3 is in fluid connection with the mixing sector.

In one aspect, the liquid retention sector has one or more outlets in order to allow for collection of pre-treated feedstock. In a further aspect, the liquid retention sector is in fluid connection with the mixing sector, either via one or more subsectors as mentioned above or directly with the mixing sector, or directly in fluid connection with the mixing sector and via one or more subsectors.

Moreover, it is clear that the liquid retention sector is provided with an out-let for collection of pre-treated feedstock and/or also provided with a re-circulation outlet to recirculate pre-treated feedstock back into the process either directly or via one or more subsectors as mentioned above.

The feedstock to be used in present invention is e.g. lipid material (fats or oils or any mixture thereof) to be purified into a material that may serve as a source for fuel of any kind or as a source of chemicals such as e.g. specialty chemicals. The important factor is that the purified lipid material has to be of such a quality that it can serve as a fuel or be used in further processes such as e.g. catalytic cracking without containing levels of impurities that may e.g. jeopardize the full functionality of an engine or poisoning of catalysts or otherwise hampering of any further processes that the purified feedstock may be subjected to. Such further processes may be e.g. catalytic cracking, thermo-catalytic cracking, catalytic hydrotreatment, catalytic hydrodeoxygenation, fluid catalytic cracking, catalytic ketonization, catalytic esterification, or catalytic dehydration. The purified feedstock may also be further processed into various chemicals, such as bulk chemicals (e.g. polymers, solvents, solvent components and lubricants) or specialty chemicals (e.g. cosmetics and pharmaceuticals).

In the art, there are various methods for purification of feedstock for the purposes mentioned herein. However, feedstock containing high level of impurities may not be suitable or feasible to be purified by techniques known in the art such that the purified lipid material contains low levels of impurities allowing it to be used as a source of fuel. Present invention solves this problem by the method as disclosed herein, thereby allowing use of a lipid material that would normally be seen as uneconomical or unsuitable for purification. Low quality feedstock that may be employed according to the invention may have a phosphorous content of at least about 2000 ppm, such as e.g. at least 1500 ppm, such as e.g. at least 1000 ppm, such as e.g. at least 500 ppm, such as e.g. at least about 400 ppm, such as e.g. at least about 300 ppm, such as e.g. at least about 200 ppm, such as e.g. at least about 100 ppm, such as e.g. at least about 50 ppm, such as e.g. at least about 30 ppm, such as e.g. at least about 20 ppm, such as e.g. at least about 15 ppm, such as e.g. at least about 10 ppm, such as e.g. at least about 5 ppm, or at least about 1 ppm. The same amount of metal impurities may be present in the feedstock.

As mentioned herein, exemplified feedstock may comprise any lipid material include, but is not limited to, low quality animal fat (AF), not accepted to catalytic hydrotreatment process (very high content of nitrogen or nitrogen containing compounds, polyethylene, metals, phosphorus contents etc.).

Such lipid material needs to be purified in order to lower the level of elements known to e.g. act as catalyst poison or otherwise render the material useless for its ultimate intended use.

The lipid material to be pretreated may contain impurities containing metals and phosphorus in the form of phospholipids, soaps or salts.

Other impurities that may be present and reduced or removed by the method of the invention are e.g. various nitrogen containing compounds, organic or inorganic chlorine compounds, sterols, polymers, oligomers etc.

Metal impurities that may be present in the lipid material may be e.g. alkali metals or alkali earth metals, such as sodium or potassium salts or magnesium or calcium salts or any compounds of said metals. The impurities may also be in form of phosphates or sulphates, iron salts or organic salts, soaps or e.g. phospholipids.

The invention claimed is:

1. An apparatus comprising:
   i) at least one mixing sector including at least 4 weirs, each of the weirs being tilted at an angle of between 5° and 20° relative to a horizontal plane, the at least one mixing sector being positioned at a top of the apparatus;
   ii) at least one liquid distribution sector positioned between the at least one mixing sector and at least one liquid retention sector;
   iii) the at least one liquid retention sector positioned at a bottom of the apparatus and having a plurality of subsectors in fluid connection with one another, each of the subsectors including a chamber and/or a vertical pipe;
   wherein the at least one liquid distribution sector includes a first plate positioned at a lower part of the at least one liquid distribution sector and configured as a liquid distributor, a second plate positioned above the first plate that extends horizontally along the horizontal plane, and a third plate positioned between the first plate and the second plate, the third plate being tilted at an angle of between 5° and 20° relative to the horizontal plane; and
   wherein the at least one liquid retention sector is in fluid connection with the at least one liquid distribution sector and is downstream of the at least one liquid distribution sector and is also positioned downstream of the at least one mixing sector; and
   wherein the plurality of subsectors includes a first subsector, a second subsector and a third subsector, a vertical pipe connecting the second subsector to the third subsector.

2. The apparatus according to claim 1, wherein the at least one mixing sector includes at least seven weirs.

3. The apparatus according to claim 2, wherein the weirs are tilted at an angle of between 5° and 15° relative to the horizontal plane.

4. The apparatus according to claim 1, wherein the at least one mixing sector also includes one or more collision plates positioned above the weirs.

5. The apparatus according to according to claim 1, wherein the at least one mixing sector also includes at least one collision plate positioned above the weirs that is positioned to extend vertically in a direction that is perpendicular to the horizontal plane.

6. The apparatus according to claim 1, wherein at least one mixing sector also includes at least one collision plate positioned above the weirs that is tilted at any angle of between 5° and 20° relative to the horizontal plane.

7. The apparatus according to claim 1, wherein the at least one liquid distribution sector is in fluid connection with the at least one mixing sector and the at least one liquid retention sector.

8. The apparatus according to claim 1, wherein at least one subsector of the plurality of subsectors is in fluid connection with the at least one mixing sector.

9. The apparatus according to claim 1, wherein the first subsector is in fluid connection with the second subsector and/or the third subsector.

10. The apparatus according to claim 1, wherein the third subsector is in fluid connection with the at least one mixing sector to recirculate material from the third subsector to the at least one mixing sector.

11. The apparatus according to claim 1, wherein the at least one mixing sector has at least five weirs.

12. The apparatus according to claim 1, wherein the at least one mixing sector has at least 20 weirs.

13. The apparatus according to claim 1, wherein the weirs are tilted at an angle of between 5° and 15° relative to the horizontal plane.

14. The apparatus of claim 1, wherein the weirs are plates or trays.

15. The apparatus of claim 1, wherein the apparatus includes a body, the body having the at least one liquid retention sector, the at least one liquid distribution sector and the at least one mixing sector.

16. An apparatus comprising:
   i) at least one mixing sector including at least 4 weirs, each of the weirs being tilted at an angle of between 5° and 20° relative to a horizontal plane, the at least one mixing sector being positioned at a top of the apparatus;
   ii) at least one liquid distribution sector positioned between the at least one mixing sector and at least one liquid retention sector;
   iii) the at least one liquid retention sector positioned at a bottom of the apparatus and having a plurality of subsectors in fluid connection with one another, each of the subsectors including a chamber and/or a vertical pipe;
   wherein the at least one liquid distribution sector includes a first plate positioned at a lower part of the at least one liquid distribution sector and configured as a liquid distributor, a second plate positioned above the first plate that extends horizontally along the horizontal plane, and a third plate positioned between the first plate and the second plate, the third plate being tilted at an angle of between 5° and 20° relative to the horizontal plane; and
   wherein the at least one liquid retention sector is in fluid connection with the at least one liquid distribution sector and is downstream of the at least one liquid distribution sector and is also positioned downstream of the at least one mixing sector;
   wherein the plurality of subsectors includes a first subsector, a second subsector, and a third subsector; and
   wherein a vertical pipe having at least one valve is positioned between the first subsector and the second subsector to fluidly connect the first subsector to the second subsector and a vertical pipe having at least one valve is positioned between the second subsector and the third subsector to fluidly connect the second subsector to the third subsector.

17. The apparatus according to claim 16, wherein the at least one mixing sector is in fluid connection with the at least one liquid distribution sector and the at least one liquid retention sector.

* * * * *